(12) United States Patent
Mercat et al.

(10) Patent No.: US 7,950,747 B2
(45) Date of Patent: *May 31, 2011

(54) WHEEL WITH TENSION SPOKES

(75) Inventors: Jean-Pierre Mercat, Chavando (FR); Claude Righini, Veyrier du Lac (FR); Benoît Saillet, Albens (FR)

(73) Assignee: Salomon S.A.S., Metz-Tessy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/508,192

(22) Filed: Aug. 23, 2006

(65) Prior Publication Data

US 2007/0046097 A1 Mar. 1, 2007

(30) Foreign Application Priority Data

Aug. 31, 2005 (FR) ...................................... 05 08914

(51) Int. Cl.
*B60B 1/04* (2006.01)

(52) U.S. Cl. ........... 301/55; 301/58; 301/59; 301/110.5; 29/894.331

(58) Field of Classification Search ...................... 301/55, 301/56, 58, 54, 57, 59, 61, 73, 74, 75, 104, 301/110.5, 60; 29/894.33, 894.331, 894.332
See application file for complete search history.

(56) References Cited

U.S. PATENT DOCUMENTS

| | | | | |
|---|---|---|---|---|
| 689,371 A * | 12/1901 | Stutsman | ......................... | 301/60 |
| 1,836,818 A * | 12/1931 | Sauzedde | ........................ | 301/56 |
| 1,910,164 A | 5/1933 | Horn | | |
| 3,606,474 A * | 9/1971 | Meiklejohn | ..................... | 301/60 |
| 3,942,839 A * | 3/1976 | Chalk | .............................. | 301/73 |
| 4,314,964 A | 2/1982 | Ferrary | | |
| 4,844,552 A | 7/1989 | Tsygankov et al. | | |
| 5,104,199 A * | 4/1992 | Schlanger | ................ | 301/64.704 |
| 5,110,190 A | 5/1992 | Johnson | | |
| 5,228,756 A | 7/1993 | Krampera | | |
| 5,249,846 A | 10/1993 | Martin et al. | | |
| 5,707,114 A | 1/1998 | Schlanger | | |
| 5,975,646 A * | 11/1999 | Campagnolo | ............ | 301/95.104 |
| 6,036,281 A | 3/2000 | Campbell | | |
| 6,257,677 B1 * | 7/2001 | Chen | ......................... | 301/95.104 |
| 6,491,350 B2 * | 12/2002 | Passarotto | ........................ | 301/58 |
| 6,679,561 B2 * | 1/2004 | Addink et al. | ................... | 301/55 |
| 6,761,847 B2 | 7/2004 | Meggiolan | | |
| 7,357,459 B2 * | 4/2008 | Schlanger | ........................ | 301/59 |

(Continued)

FOREIGN PATENT DOCUMENTS

EP 0 494 277 B1 7/1992

(Continued)

*Primary Examiner* — S. Joseph Morano
*Assistant Examiner* — Kip T Kotter
(74) *Attorney, Agent, or Firm* — Greenblum & Bernstein, P.L.C.

(57) ABSTRACT

A tension-spoke wheel including a rim, spokes, and a central hub, the exterior of the rim having a tire-receiving channel that defines a median plane, and an interior of the rim having spoke fastening zones that define a median plane for fastening the spokes, the hub having a median plane and two flanges for fastening the spokes, one of the flanges being closer to the median plane of the hub than the other, and at least the spokes fastened to the flange that is closer to the median plane of the hub lacking individual tensioning mechanisms. The spokes fastened to the flange that is closer to the hub median plane are fastened to the rim on the side of the median plane of the tire-receiving channel that is opposite the closer flange.

30 Claims, 5 Drawing Sheets

U.S. PATENT DOCUMENTS

| | | | |
|---|---|---|---|
| 2002/0074853 A1* | 6/2002 | Krampera | 301/55 |
| 2002/0149257 A1* | 10/2002 | Miansian et al. | 301/74 |
| 2003/0085610 A1* | 5/2003 | Addink et al. | 301/55 |
| 2004/0026986 A1* | 2/2004 | Jager | 301/58 |
| 2007/0063574 A1 | 3/2007 | Mercat et al. | |

FOREIGN PATENT DOCUMENTS

| | | |
|---|---|---|
| EP | 1 231 077 A2 | 8/2002 |
| FR | 2 460 195 A | 1/1981 |
| FR | 2 672 251 A | 8/1992 |
| FR | 2 701 899 A1 | 9/1994 |
| FR | 2 713 543 A1 | 6/1995 |
| FR | 2 784 622 A1 | 4/2000 |
| FR | 2 792 250 A1 | 10/2000 |
| WO | WO-91/13771 A2 | 9/1991 |
| WO | WO-92/01574 A1 | 2/1992 |

* cited by examiner

WHEEL WITH TENSION SPOKES

CROSS-REFERENCE TO RELATED APPLICATION

This application claims priority under 35 U.S.C. §119 of French Patent Application No. 05.08914, filed on Aug. 31, 2005, the disclosure of which is hereby incorporated by reference thereto in its entirety.

BACKGROUND OF THE INVENTION

1. Field of the Invention

The invention relates to a wheel having tension spokes, particularly such a wheel adapted to be used for a bicycle. More particularly, the invention relates to a wheel in which the rim and the spokes are made of a composite material.

2. Description of Background and Relevant Information

As is known in the art of bicycles in particular, the use of a composite material for the manufacture of bicycle components enables one to reduce the weight of such components, compared to such components being made of metallic materials. Further, a composite material, such as carbon fiber material, has a specific modulus and a specific strength that are higher than that of metals, such as that of aluminum which is typically used for wheel rims, or stainless steel that is typically used for spokes. Furthermore, composite materials have a better resistance to fatigue than metal.

It is thus known to make a bicycle wheel rim from a composite material. The following patent documents disclose rims of this type: FR 2 460 195; U.S. Pat. No. 4,314,964; FR 2 672 251; U.S. Pat. No. 5,249,846; FR 2 713 543; EP 1 231 077; and U.S. Pat. No. 6,761,847. To make the rim as a box-structure, sometimes a core on which the resin-coated composite layers are arranged is proposed; sometimes, an inflatable bladder that is arranged inside the mold and inflated is proposed.

Spokes made of a composite material are also known, as described in the patent documents WO 91/13771; U.S. Pat. No. 5,110,190; FR 2 784 622; and U.S. Pat. No. 6,036,281.

With respect to wheel assemblies made of a composite material, the patent document FR 2 701 899 discloses a compression-spoke wheel made by molding.

U.S. Pat. No. 5,104,199 discloses a wheel made in left and right halves that are joined together. Each half includes a rim portion and a set of spokes having a central portion for assembly to the hub. These elements are made all in one piece. During assembly, the two wheel halves are joined together, and the central portions of the spokes are mounted on a hub body, where they are kept spaced apart by means of two elastic blocking washers that are engaged in a groove. The spacing of the washers enables the spokes to be tensioned, which provides the wheel with rigidity.

In the same context, as shown in FIG. 24 U.S. Pat. No. 5,707,114 proposes to force the spacing of the central portions to enable the engagement of a tubular spacer in the center of the wheel.

U.S. Pat. No. 4,844,552 also discloses a wheel in which the tension of the spokes is adjusted by forcing the two spoke fastening flanges to be spaced apart in the area of the hub.

These methods of construction are advantageous as the resulting wheels are very light due to the absence of parts that enable the spoke tension to be adjusted. However, it is difficult to achieve a high spoke tension for a rear wheel in this fashion. Indeed, due to the presence of the free wheel, the central portion of the spoke set located on the side of the free wheel is close with respect to the median plane of the wheel, so that only a small amount of displacement is available for the portion to tension the spokes.

This problem is not specific to wheels made of a composite material. In general, the problem arises for any wheel whose spokes lack individual tension adjustability, at least on the side of the free wheel, and for which the spoke tension is adjusted by spacing apart the two spoke sets in the area of the hub.

In view of the prior art, there is a need for a wheel that makes it possible to achieve a higher spoke tension.

SUMMARY OF THE INVENTION

A tension-spoke wheel according to the invention includes a rim, a plurality of spokes, and a central hub, the rim exteriorly having a tire-receiving channel that defines a median plane, and interiorly having spoke-connecting zones that define a median plane for connecting the spokes, the hub having a median plane and two flanges to which the spokes are connected, one of the flanges being closer to the median plane of the hub than the other, and at least the spokes connected to the flange that is closer to the median plane of the hub lack individual tensioning means, the spokes connected to the flange that is closer to the hub median plane being connected to the rim on the side of the median plane of the tire-receiving channel that is opposite the closer flange.

BRIEF DESCRIPTION OF DRAWINGS

For the purpose of providing a further understanding, the invention will be described below with reference to the annexed drawings, in which.

DETAILED DESCRIPTION OF THE INVENTION

Figure 1:
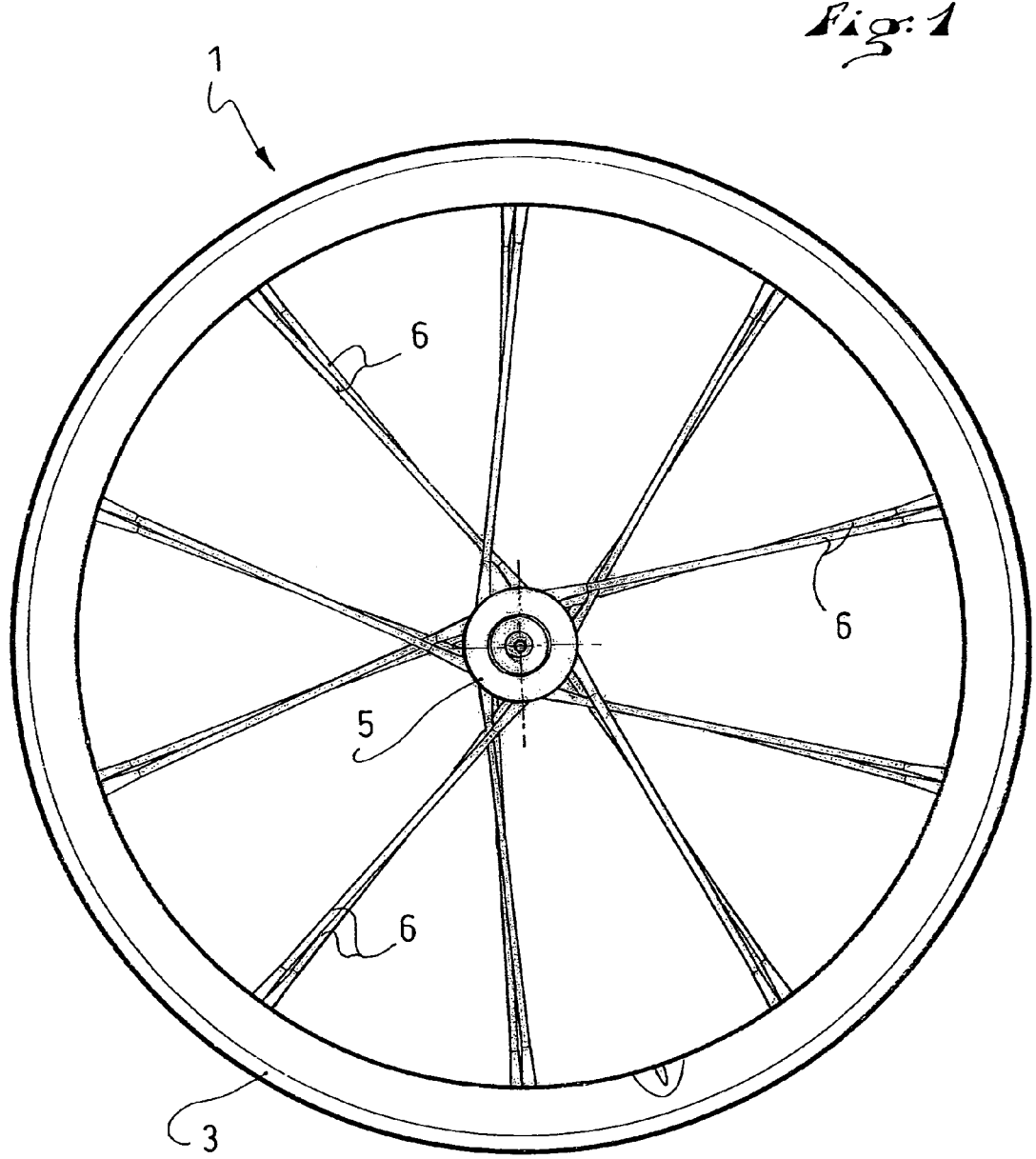
FIG. 1 is an overall side view of a wheel.

FIG. 1 shows a side view of a wheel 1. The wheel includes a peripheral rim 3, a central hub 5, and spokes 6 connected between the rim and the hub. The wheel shown is a rear wheel, such as the rear wheel of a bicycle. However, this is non-limiting, as the invention also applies to a front wheel.

The wheel shown includes twenty spokes distributed in two sets of ten spokes each. The number of spokes is not limiting with respect to the invention.

Figure 2:
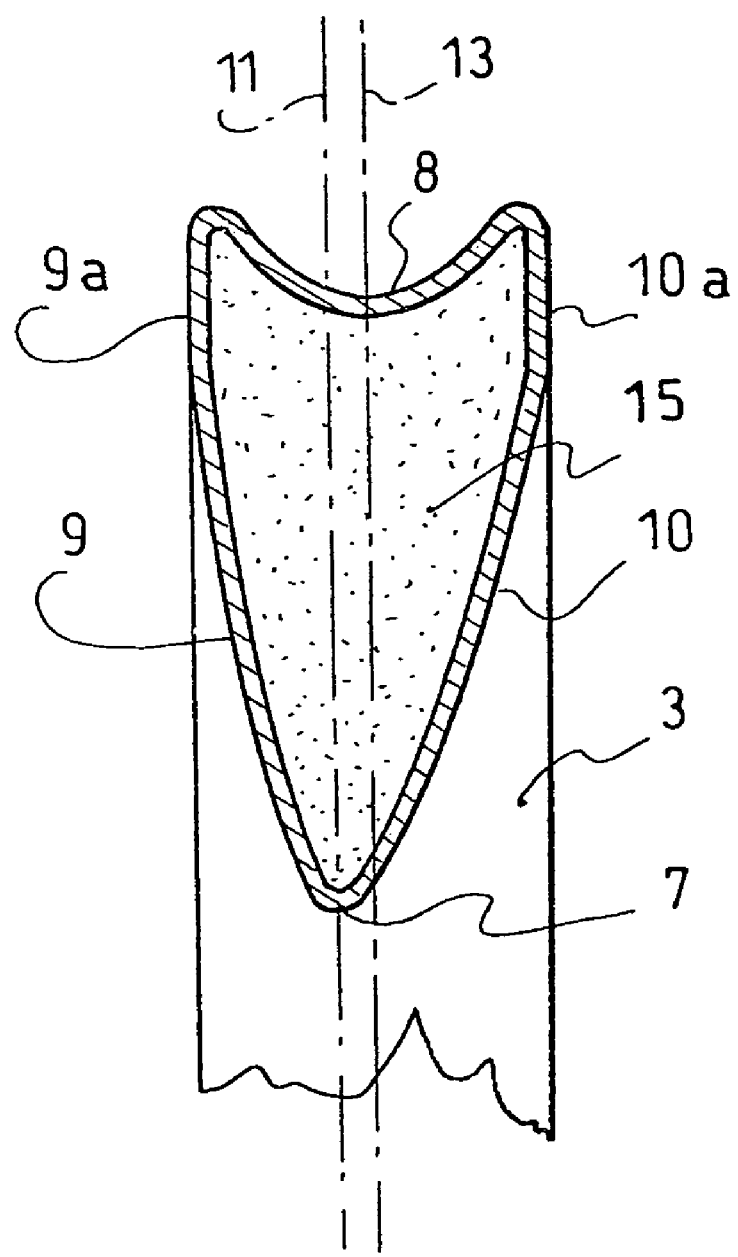
FIG. 2 shows a cross-section of the rim of the wheel of FIG. 1.

The rim 3 is shown in cross-section in FIG. 2. As can be seen in this drawing figure, the rim has a tapered cross section, a cross-sectional height in the plane of FIG. 2 that is approximately double the width. The rim includes a base 7, an upper bridge 8, and connecting walls 9 and 10. The upper portions of these walls are parallel, or substantially parallel, and provide two braking surfaces 9a and 10a.

The rim shown is provided to receive a tube. To this end, the exterior of the rim, i.e., exterior with respect to the transverse axis of the hub 5, has a channel for receiving the pneumatic tire. This is not limiting, as the rim could have in its upper portion a tire-receiving channel formed by a pair of flanges extending radially away from the connecting walls 9, 10, i.e., the braking surfaces thereof. The tire-or tube-receiving channel defines a median plane that is schematically shown by means of the broken line 13 in FIGS. 2-4.

The rim shown in FIG. 2 has an asymmetrical cross section, that is, the base 7 is axially offset with respect to the median plane 13. The asymmetry offset has a value between 0.5 and 4.0 millimeters, or between approximately 0.5 and approximately 4.0 millimeters, such as on the order of 3.0 millimeters. The effect of this asymmetry on the tension of the spokes is explained below.

The rim 3 is made of a composite material, such as carbon fibers embedded in an epoxy or polyester resin matrix, for example. The rim could also be made of a metal, such as an aluminum alloy.

Any appropriate manufacturing method can be used to make the rim 3. For example, the wall of the rim can be formed on a core 15 made of a light-weight material. This can be an acrylic foam, for example, that has been prepared by machining or by hot bending. The rim wall includes a plurality of resin-impregnated carbon fiber laps. One can use laps that are resin-impregnated or proceed using the wet method, that is, impregnating the laps with resin after they are positioned around the core. The assembly is then placed in a curing mold in order to cure the resin.

Alternatively, other methods of construction could be utilized.

In a known manner, the hub 5 includes a hub body 18 to which the spokes are connected, the hub body including a tubular portion 18a and an end-piece 18b provided for mounting the free wheel mechanism. This mechanism can be of any appropriate type known to those skilled in the art and is not described in further detail.

The spokes 6 are distributed in two spoke sets, a first set of spokes 20 located on the side of the free wheel and a second set of spokes 22 located on the side opposite the free wheel. At one end, each of the spokes is connected to the rim 3. For example, they can be glued by means of an epoxy glue or the like against the walls 9 and 10 in spoke fastening zones. These zones for fastening the spokes 20 and 22 define a spoke fastening median plane that is schematically indicated by means of the broken line 11 in FIGS. 2-4. For the rim shown, the extreme portion of the base, that is, its narrower portion, is located in this spoke fastening median plane 11.

At the other end, each of the spokes is fastened to a flange 21 for the spoke set on the side of the free wheel and to a flange 23 for the other set.

The spokes are very rigid in tension and lack individual tensioning means at least for the spokes that are located on the side of the free wheel, that is, for the most flattened, i.e., the least dished, set. That is, at least the spokes on the side of the free wheel are non-adjustably fastened to the flange 21. For example, they are made of a composite material, such as carbon fibers embedded in an epoxy resin matrix. The rigidity in tension is close to 4000 Nm for this material. Alternatively, other materials can be used.

To assemble the wheel, for example, the two flanges 21, 23 are movably mounted along the tubular portion 18a of the body of the hub. The tensioning of the spokes is carried out by spacing apart the two flanges 21, 23 and by maintaining them spaced apart on the hub body by any appropriate means, for example, glue, a spacer, or plastic or elastic rings engaged in a groove of the tubular portion 18a. Due to the spoke rigidity in tension, the tension in the spokes rises quickly as soon as the flanges 21, 23 are spaced apart.

The tension in the spokes varies with the square of the distance between the fastening flange and the fastening median plane. It is therefore important to be able to space the two flanges apart as far as possible.

Thus, according to the embodiment shown, the spokes are fastened to the two flanges 21 and 23. The two flanges are connected along the tubular portion 18a and are spaced apart, as shown, e.g., in FIG. 4. Once spaced apart by the desired distance, they are fixed to the hub body, such as with epoxy glue. Other techniques for assembling the wheel and tensioning the spokes could be used, such as those described in the patent documents cited above to illustrate the state of the art. In this regard, FIG. 5 schematically shows the flanges 21, 23 being spaced apart by means of a spacer 18c.

Figure 3:
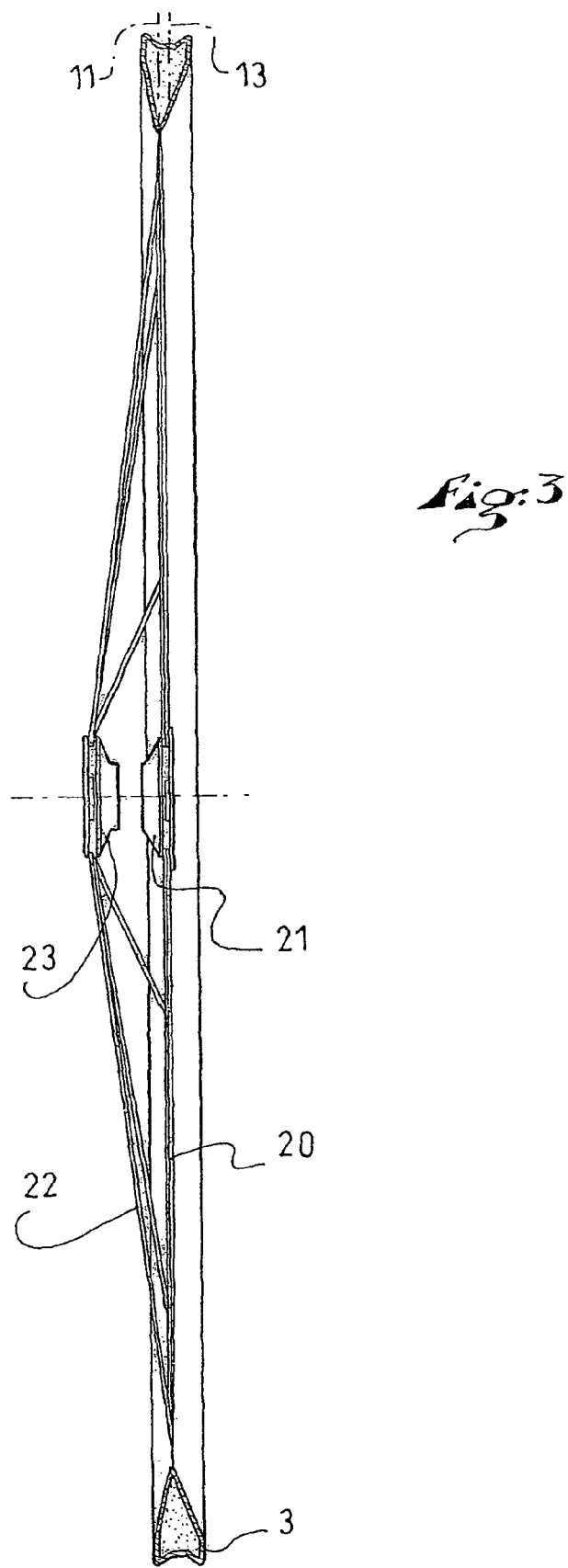
FIG. 3 shows an end view of the wheel prior to spoke tensioning.
Figure 4:
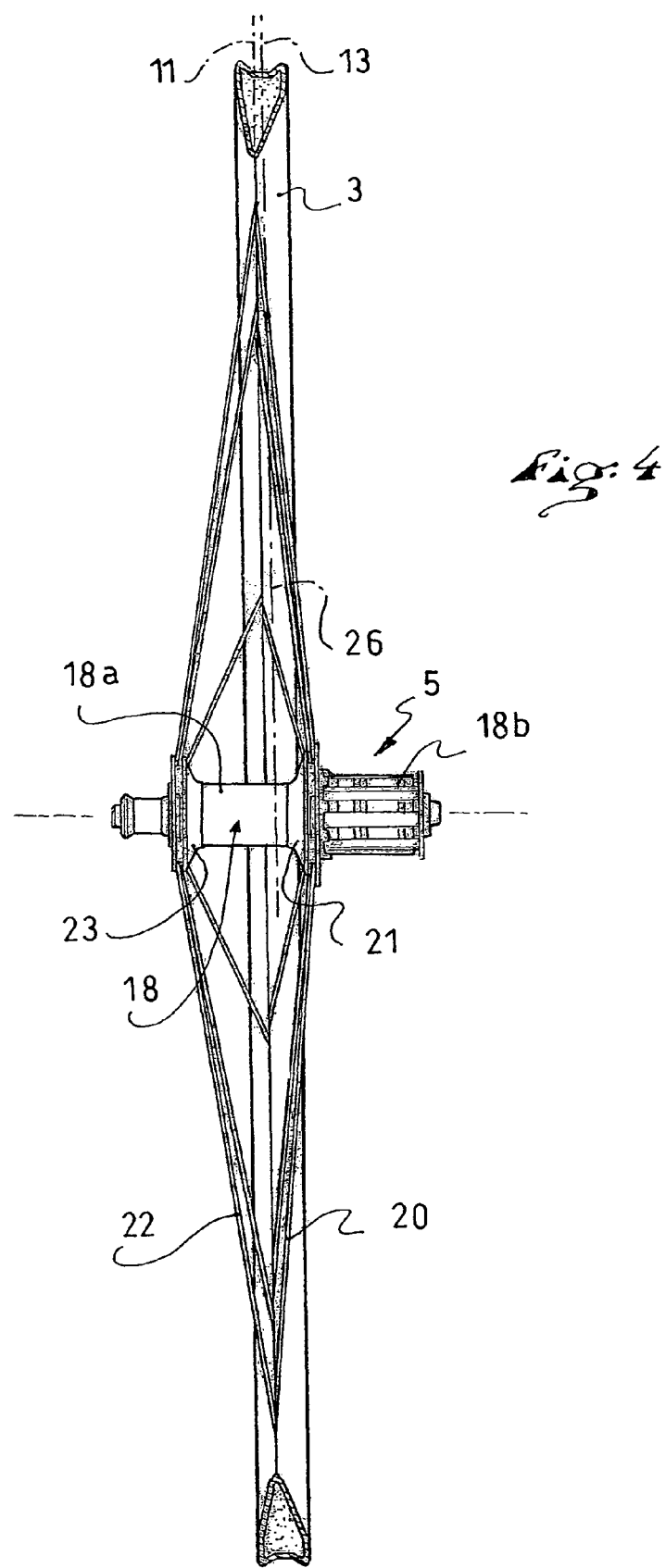
FIG. 4 shows the wheel of FIG. 3 after spoke tensioning.
Figure 5:
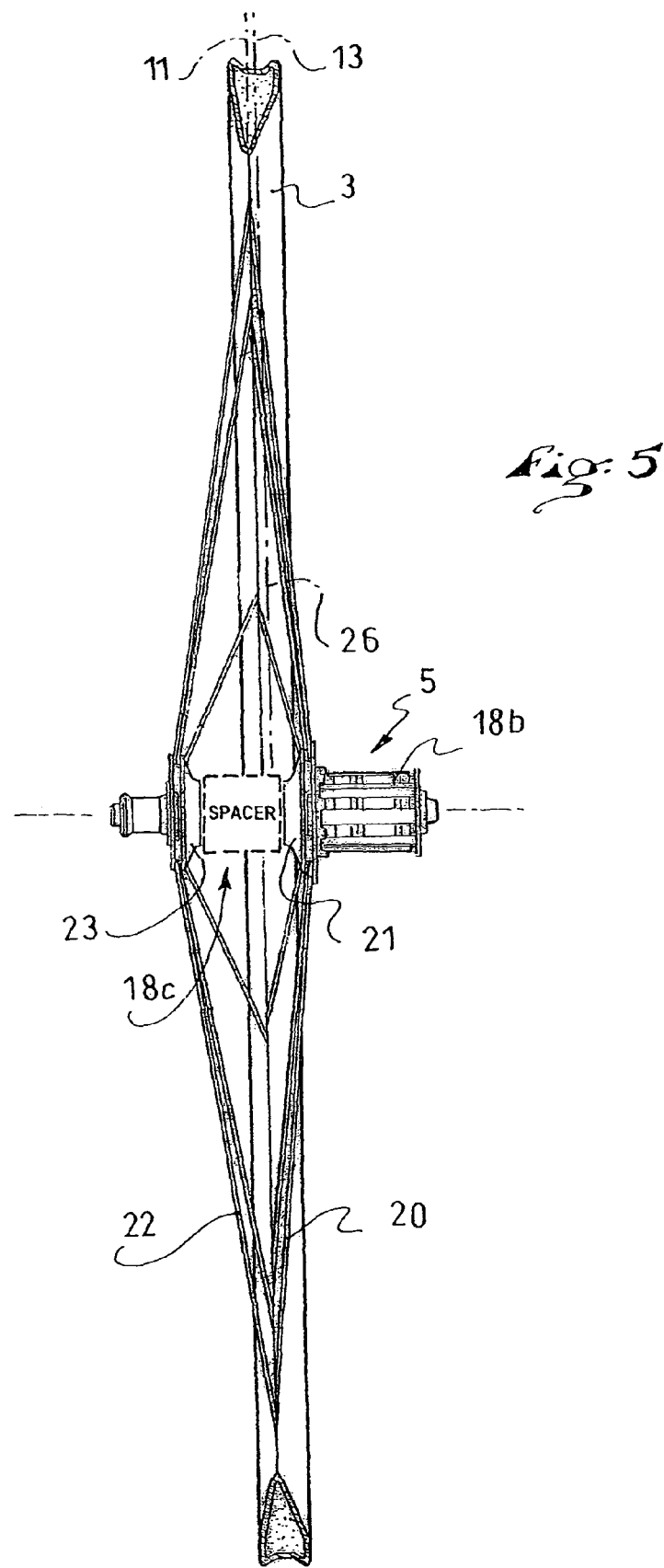
FIG. 5 shows the wheel of FIG. 3 after spoke tensioning by means of a spacer.

FIG. 3 shows the non-tensioned spoke sets and FIG. 4 shows the tensioned spoke sets. In FIG. 4, the median plane of the hub 18 is indicated by means of the broken line 26. This drawing figure shows that the flange 21 of the most flattened set is closer to the plane 26 than the other flange 23.

When the spokes are tensioned, the median plane 13 of the rim coincides with the median plane 26 of the hub, as shown in FIG. 4.

For example, the width of the hub assembly is typically 130 millimeters for a road wheel. Due to the presence of the free wheel, the spoke fastening flange 21 that is located on the side of the free wheel is at a distance of about 48 millimeters from the end of the hub, which places it at a distance of about 17 millimeters from the median plane of the hub. This distance will be referred to as the flange offset on the side of the free wheel. It is difficult to increase this distance in view of the space requirement of the free wheel. This space requirement is linked to the number of sprockets employed and, as a general rule, it is the same for all rear wheels.

On the side opposite the free wheel, the flange 23 can occupy a position on the tubular portion 18a of the hub body that places it at about 43 millimeters from the median plane of the hub, once the spokes are tensioned.

The difference between these distances also induces a difference in the dish aperture angles formed by the spoke sets; that is, the spoke set on the side of the free wheel is more flattened that the other. Also, the spokes of the set located on the side of the free wheel are shorter than the spokes of the other set, and the spokes of the set on the side of the free wheel, once tensioned, are subject to a higher tension than the spokes of the other set. The rim is maintained in balance between the two flanges by the tension of the spokes of the two sets.

Because the rim 3 is asymmetrical in cross-section, the median plane 13 of the rim is offset in the direction of the free wheel with respect to the median plane 11 for fastening the spokes, and the spokes that are fastened to the flange 21 located on the side of the free wheel are fastened to the rim on the side of the median plane 13 that is opposite the free wheel. Thus, if the set of spokes 20 is assumed to be planar when the spokes are non-tensioned, i.e., the spokes 20 extend along a plane, the set of spokes 20 being non-dished when not tensioned, as shown in FIG. 3, which is the most favorable case for obtaining a high tension in the spokes, the median plane of the rim is at a distance that is equal to the sum of the flange offset on the side of the free wheel and of the asymmetry offset of the rim. To bring the median plane 13 of the rim in coincidence with the median plane 26 of the hub, it is necessary to space apart the flanges 23 and 21 in order to displace the rim by a distance equal to the sum of the offsets. It is this displacement that generates a tension in the spokes and provides the wheel with rigidity.

With respect to a symmetrical rim, the distance of the rim axial displacement is increased, which induces an additional tension in the spokes. It is noted that a 3-millimeter asymmetry offset induces a spoke tension increase of 43% on the side of the free wheel, and of 70% on the opposite side in relation to a symmetrical rim. The spoke tension increase on the side opposite the free wheel prevents the spokes on that side from becoming loose during use.

The additional rim displacement distance is obtained by an additional spacing of the flange 23 along the tubular portion 18a of the hub body. In the case where the spacing is obtained by means of a spacer, a longer spacer is provided. Other means can also be used for shortening the spokes, such as spokes 22 of the set that is located on the side opposite the free wheel.

The spokes 20 of the most flattened set located on the side of the free wheel can also be fastened to the wall 9 of the rim located on the side opposite the free wheel in relation to the median plane 13 of the tire-receiving channel. This contributes to offsetting the rim on the side of the most flattened set in the absence of tension in the spokes.

The description of the invention is not limited to the particular embodiment that has just been described. Other embodiments of the invention could be adopted without leaving the scope thereof.

In particular, the invention is not limited to the particular wheel construction that has been described. In particular, the wheel could be made in two halves, each half including a half rim and the spokes; the two halves could then be assembled and the spokes fastened onto the hub. Moreover, the invention is not limited to a wheel made of a composite material. It also applies to wheels, the rim and/or spokes of which are metallic and, in general, to any tension-spoke wheel, the spokes of which lack individual tensioning means, at least for the spokes of the most flattened set, and in which the spoke tension is adjusted by a relative spacing of the structure that connects the spokes to the hub.

Further, the invention is not limited to a rim having a base and a bridge on the outside. It also covers rims that would have one or several additional bridges between the base and the outer bridge.

Still further, the invention is not limited to a rear wheel; it also applies to a front wheel and, in general, to any wheel having two spoke sets that form non-symmetrical dishes, one of the sets being closer to the median plane of the hub than the other set. In particular, this can be a wheel provided for use with a disk brake. For such a wheel, one of the spoke sets is flattened to clear an amount of space at one end of the hub for enabling the disk to be mounted.

The flanges for fastening the spokes to the hub are to be understood, in general, as incorporating or supporting any structural arrangement to enable the spokes to be connected to the hub, such as, for example, flanges having openings with arcuate seats for engagement with the enlarged heads at the spoke ends, flanges having peripherally open slots for receiving the spokes, or various other arrangements.

The invention claimed is:

1. A tensioned spoke wheel comprising:
a rim;
a central hub; and
a plurality of spokes extending between the rim and the central hub;
an exterior of the rim having a tire-receiving channel defining a median plane;
an interior of the rim having spoke fastening zones defining a median plane for fastening the spokes;
the hub having a median plane and two flanges for fastening the spokes, a first of the two flanges being axially closer to the median plane of the hub than a second of the two flanges;
more than one of the plurality of spokes being fastened to the first of the two flanges;
more than one of the plurality of spokes being fastened to the second of the two flanges;
said more than one of the plurality of spokes fastened to the first of the two flanges lacking individual tensioning means;
said more than one of the plurality of spokes fastened to the first of the two flanges being fastened to the rim on a side of the median plane of the tire-receiving channel that is opposite said first of the two flanges;
each of the spokes fastened to the first of the two flanges having a length different from a length of each of the spokes fastened to the second of the two flanges; in a non-tensioned state, the spokes fastened to the first of the two flanges extend within a plane, the spokes fastened to the second of the two flanges not extending within a plane.

2. A wheel according to claim 1, wherein:
the rim is asymmetrical in transverse cross-section;
the median plane of the tire-receiving channel is offset, with respect to the spoke fastening median plane, toward the first of the two flanges.

3. A wheel according to claim 2, wherein:
the median plane of the tire-receiving channel is offset, with respect to the spoke fastening median plane, by a distance between 0.5 and 4.0 millimeters or between approximately 0.5 and 4.0 millimeters.

4. A wheel according to claim 2, wherein:
the median plane of the tire-receiving channel is offset, with respect to the spoke fastening median plane, by a distance of 3.0 millimeters or approximately 3.0 millimeters.

5. A wheel according to claim 1, wherein:
the rim and the spokes are made of a non-metallic composite material.

6. A wheel according to claim 1, wherein:
at least one of the flanges for fastening the spokes is assembled to the hub with glue.

7. A wheel according to claim 1, wherein:
the two flanges are spaced apart by means of a spacer.

8. A wheel according to claim 1, further comprising:
glue between at least one of the two flanges and the hub, said one of the two flanges thereby being secured to the hub.

9. A wheel according to claim 1, wherein:
each of the spokes fastened to the first of the two flanges has a length less than a length of each of the spokes fastened to the second of the two flanges.

10. A wheel according to claim 1, wherein:
each of the spokes fastened to the first of the two flanges is subject to a higher tension than a tension of each of the spokes fastened to the second of the two flanges.

11. A wheel according to claim 1, wherein:
the rim is asymmetrical in transverse cross-section;
the median plane of the tire-receiving channel is offset, with respect to the spoke fastening median plane, toward the first of the two flanges;
said more than one of the plurality of spokes fastened to the first of the two flanges being fastened to the rim on a side of the median plane of the tire-receiving channel that is opposite said first of the two flanges;
said more than one of the plurality of spokes fastened to the second of the two flanges being fastened to the rim on a side of the median plane of the tire-receiving channel that is opposite said first of the two flanges.

12. A wheel according to claim 1, wherein:
the spokes fastened to the first of the two flanges are fastened to the rim with glue.

13. A spoked wheel comprising:
a rim;
an exterior of the rim having a tire-receiving channel defining a rim median plane;
an interior of the rim having spoke fastening zones defining a spoke-fastening median plane;
a central hub having a median plane, a first spoke-fastening flange and a second spoke-fastening flange spaced apart on opposite sides of said median plane of said central hub;
the first spoke-fastening flange being axially closer to the median plane of said central hub than the second spoke-fastening flange;
a first set of spokes extending between the rim and the first spoke-fastening flange;
a second set of spokes extending between the rim and the second spoke-fastening flange;
at least a plurality of the first set of spokes being non-adjustably fastened to the rim and to the first flange;
the first set of spokes being fastened to the rim on a side of the rim median plane that is opposite said first spoke-fastening flange;
in a non-tensioned state, the first set of spokes being non-dished and the second set of spokes not extending within a plane
in a tensioned state, the first set of spokes is dished;
each of the spokes of the first set of spokes having a length different from a length of each of the spokes of the second set of spokes.

14. A wheel according to claim 13, wherein:
the rim is asymmetrical in transverse cross section;
the rim median plane is offset, with respect to the spoke-fastening median plane, toward the first spoke-fastening flange.

15. A wheel according to claim 13, wherein:
the rim and the first and second sets of spokes are made of a non-metallic composite material.

16. A wheel according to claim 13, wherein:
the first and second spoke-fastening flanges are structured and arranged to be movably adjustably positioned along a tubular portion of said central hub;
the first and second sets of spokes are maintained in the tensioned state by means of the flanges being maintained spaced apart by means of a spacer.

17. A wheel according to claim 13, further comprising:
glue between at least the first spoke-fastening flange and the hub, said first spoke-fastening flange thereby being secured to the hub.

18. A wheel according to claim 13, wherein:
in the tensioned state, the first set of spokes is less dished than the second set of spokes.

19. A wheel according to claim 13, wherein:
the central hub further comprises an end piece structured and arranged for mounting a freewheel mechanism.

20. A wheel according to claim 13, wherein:
the rim is asymmetrical in transverse cross-section;
the median plane of the tire-receiving channel is offset, with respect to the spoke fastening median plane, toward the first of the two flanges;
each spoke of the first set of spokes fastened to the first spoke-fastening flange is fastened to the rim on a side of the median plane of the tire-receiving channel that is opposite the first spoke-fastening flange;
each spoke of the second set of spokes fastened to the second spoke-fastening flange is fastened to the rim on a side of the median plane of the tire-receiving channel that is opposite the first spoke-fastening flange.

21. A wheel according to claim 13, wherein:
the rim is asymmetrical in transverse cross section and has an asymmetry offset, whereby the median plane of the tire-receiving channel of the rim is offset, with respect to the spoke-fastening median plane of the rim, toward the first spoke-fastening flange;
the first spoke-fastening flange is structured and arranged for adjustable axial movement along a tubular portion of the central hub;
the spokes of the first set of spokes are movable from a non-tensioned state to a tensioned state in response to said movement of the first spoke-fastening flange;
in said non-tensioned state, the first set of spokes extend within the spoke-fastening median plane;
in said non-tensioned state, the median plane of the rim and the median plane of the central hub do not coincide;
in said tensioned state, the first set of spokes are dished and the first spoke-fastening flange has a flange offset, said flange offset being a distance the first spoke-fastening flange is spaced from the spoke-fastening median plane;
in said tensioned state of the first set of spokes, relative to said non-tensioned state of the first set of spokes, the rim is axially spaced a distance equal to a sum of the asymmetry offset plus the flange offset, and the median plane of the rim and the median plane of the central hub coincide.

22. A wheel according to claim 13, wherein:
the first set of spokes is fastened to the rim with glue.

23. A tensioned spoked wheel comprising:
a rim made of a non-metallic composite material;
the rim being asymmetrical in transverse cross section;
an exterior of the rim having a tire-receiving channel defining a median plane;
the rim having spoke fastening zones defining a median plane for fastening the spokes;
the median plane of the tire-receiving channel being offset, with respect to the spoke-fastening median plane, toward the first spoke-fastening flange;
a central hub rotatable around an axis, the central hub having a median plane perpendicular to said axis;
the central hub further comprising a first spoke-fastening flange and a second spoke-fastening flange, said first and second flanges being spaced apart on opposite sides of the median plane of the central hub, said opposite sides consisting of a first flange side and a second flange side of the median plane of the central hub;
the first spoke-fastening flange being axially closer to the median plane of the central hub than the second spoke-fastening flange;
the central hub further comprising an axially extending end piece structured and arranged for mounting a freewheel mechanism, the end piece being on the first flange side of the median plane of the central hub;
a first set of spokes extending between the rim and the first spoke-fastening flange;
a second set of spokes extending between the rim and the second spoke-fastening flange;
the first set of spokes being movable between a non-tensioned state and a tensioned state; in the tensioned state, the median plane of the rim and the median plane of the central hub being co-extensive; in the tensioned state, the first set of spokes being less dished than the second set of spokes; in the non-tensioned state, the first set of spokes being non-dished and the second set of spokes not extending within a plane;
the first and second sets of spokes being made of a non-metallic composite material;

at least a plurality of the first set of spokes being non-adjustably fastened to the rim and to the first flange;

the first set of spokes being fastened to the rim on a side of the median plane of the tire-receiving channel opposite the first spoke-fastening flange;

each of the spokes of the first set of spokes having a length different from a length of each of the spokes of the second set of spokes.

24. A wheel according to claim 23, wherein:

the spokes of the first set of spokes are made of a non-metallic composite material.

25. A wheel according to claim 24, wherein:

the spokes of the first set of spokes are fastened to the rim with glue.

26. A method for assembling a wheel, the wheel comprising:

a rim;

a central hub having a median plane and two flanges for fastening the spokes, a first of the two flanges being axially closer to the median plane of the central hub than a second of the two flanges; and a plurality of spokes comprising a first set of spokes and a second set of spokes, the first set of spokes having no individual spoke-tensioning means;

spokes of the first set of spokes having a length less than a length of spokes of the second set of spokes;

an exterior of the rim having a tire-receiving channel defining a median plane;

the rim having spoke fastening zones defining a median plane for fastening the spokes;

said method comprising:

fastening each spoke of the first set of spokes to both the rim and the first of the two flanges;

fastening each spoke of the second set of spokes to both the rim and the second of the two flanges;

tensioning the first and second sets of spokes by axially spacing apart the two flanges of the central hub; in a non-tensioned state, the first set of spokes having a non-dished configuration and the second set of spokes not extending within a plane; said tensioning the first and second set of spokes by axially spacing apart the two flanges of the central hub comprising moving said first set of spokes from said non-dished configuration to a dished configuration.

27. A method for assembling a wheel according to claim 26, further comprising:

maintaining tension in the first and second sets of spokes by fixing the two flanges against movement toward each other.

28. A method for assembling a wheel according to claim 26, further comprising:

maintaining tension in the first and second sets of spokes by fixing the two flanges against movement toward each other with glue.

29. A method for assembling a wheel according to claim 26, further comprising:

maintaining tension in the first and second sets of spokes by fixing the two flanges against movement toward each other by means of securing a spacer between the two flanges.

30. A method for assembling a wheel according to claim 26, wherein:

during said tensioning, the method further comprises moving the median plane of the hub from a position not coinciding with the median plane of the rim to a position coinciding with the median plane of the rim.

* * * * *